(12) United States Patent
Lee

(10) Patent No.: US 6,561,400 B2
(45) Date of Patent: May 13, 2003

(54) MOUNTING ASSEMBLY FOR MOTOR VEHICLES

(76) Inventor: Michael Lee, 13533 Lake Luntz Dr., Winter Garden, FL (US) 34787

( * ) Notice: Subject to any disclaimer, the term of this patent is extended or adjusted under 35 U.S.C. 154(b) by 0 days.

(21) Appl. No.: 09/887,894

(22) Filed: Jun. 22, 2001

(65) Prior Publication Data

US 2001/0035478 A1 Nov. 1, 2001

Related U.S. Application Data

(63) Continuation-in-part of application No. 09/469,018, filed on Dec. 13, 1999, now Pat. No. 6,378,815.

(51) Int. Cl.$^7$ ................ B62J 7/06; F16L 3/00
(52) U.S. Cl. ............ 224/413; 224/420; 248/121; 248/125.8; 248/178.1
(58) Field of Search ............... 224/413, 420, 224/421; 74/551.1, 551.3, 551.8; 280/278; 248/121, 125.8, 159, 176.3, 178.1, 185.1, 205.2

(56) References Cited

U.S. PATENT DOCUMENTS

| | | | | |
|---|---|---|---|---|
| 1,130,933 A | * | 3/1915 | Rupert | 74/551.1 |
| D99,586 S | * | 5/1936 | Pease | 74/551.8 |
| 2,169,256 A | * | 8/1939 | Kraeft | 74/551.8 |
| 3,556,557 A | * | 1/1971 | Blair, III | 280/279 |
| 4,329,076 A | | 5/1982 | Coreth | |
| 4,436,350 A | | 3/1984 | Jolin | |
| 4,445,228 A | | 4/1984 | Bruni | |
| 4,466,660 A | | 8/1984 | Mabie | |
| 4,770,435 A | * | 9/1988 | Cristie | 188/24.12 |
| 4,789,176 A | | 12/1988 | Carroll | |
| 4,981,243 A | | 1/1991 | Rogowski | |
| 5,005,661 A | | 4/1991 | Taylor et al. | |
| D325,679 S | | 4/1992 | O'Mealy et al. | |
| 5,114,060 A | | 5/1992 | Boyer | |
| 5,144,546 A | | 9/1992 | Burdi | |
| 5,154,381 A | | 10/1992 | Malinao | |
| 5,154,391 A | | 10/1992 | Hegarty | |
| 5,159,712 A | | 10/1992 | Schneider et al. | |
| 5,303,944 A | | 4/1994 | Kalmus | |
| 5,332,183 A | * | 7/1994 | Kagayama | 224/420 |
| 5,390,656 A | | 2/1995 | Villa et al. | |
| 5,470,090 A | | 11/1995 | Stewart et al. | |
| 5,669,370 A | | 9/1997 | Breedlove | |
| 5,690,307 A | | 11/1997 | Joyce | |
| 5,732,965 A | | 3/1998 | Willey | |
| 5,911,395 A | | 6/1999 | Hussaini | |
| 5,911,523 A | | 6/1999 | Burchard | |
| 5,954,208 A | | 9/1999 | Schultz | |
| 6,244,131 B1 | * | 6/2001 | Liao | 74/551.1 |
| 6,428,192 B1 | * | 8/2002 | Chen | 362/191 |

* cited by examiner

Primary Examiner—Stephen K. Cronin
(74) Attorney, Agent, or Firm—Robert L. Wolter, Esq.; Beusse Brownlee Bowdoin & Wolter, PA

(57) ABSTRACT

The mounting assembly includes a shaft having a mounting member mounted on a top end of the shaft. The mounting member is preferably mounted so it pivots with respect to the shaft. The shaft is insertable in a hollow cylinder on a motor vehicle. In the case of a motorcycle, a portion of the shaft is inserted in a steering stem of a steering head. A plurality of o-rings, attached to the portion of the shaft inserted in the cylinder, secure the mounting assembly in place. A Velcro™ piece, fixed to a top surface of the mounting member, clasps to a corresponding Velcro™ piece of an electronic device placed on the mounting assembly.

11 Claims, 7 Drawing Sheets

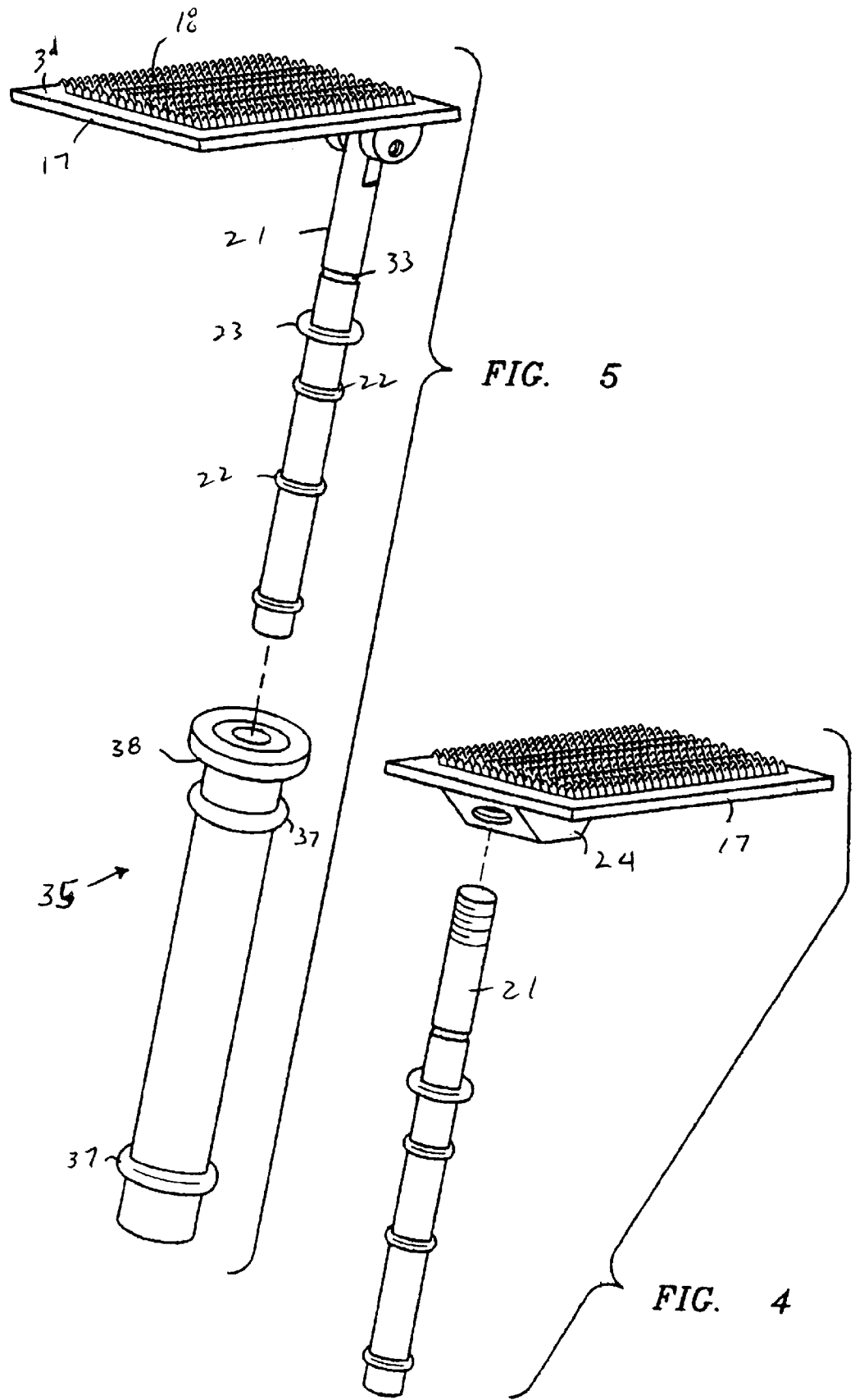

MOUNTING ASSEMBLY FOR MOTOR VEHICLES

This is a continuation in part of Ser. No. 09/469,018, filed Dec 13, 1999, now U.S. Pat. No. 6,378,815, from which the Applicant claims priority.

FIELD OF THE INVENTION

The field of this invention relates generally to mounting assemblies used to mount accessory devices on motor vehicles. More specifically, it relates to mounting assemblies used for motorcycles, and in particular for mounting radar detection devices, GPS devices, etc., on motorcycles.

BACKGROUND

Motorcycles continue to grow in popularity throughout the United States and the world. In particular, people drive motorcycles for recreation such as touring or cruising as a substitute for automobile transportation. Motorcycle enthusiasts cruise highways often prefer to use radar detection devices, and other small electronics as cellular telephones or global positioning satellite devices.

Unfortunately, the sport and sport-touring motorcycles incorporate a steering head that restricts the space available for mounting such devices on the motorcycle.

SUMMARY OF THE INVENTION

Accordingly, it is an object of this invention to provide a mounting assembly adapted to be used with existing motorcycle steering heads and other motor vehicles with similar arrangements. Another object of this invention is to provide such an assembly that can be easily inserted or removed from a motorcycle steering head or similar arrangements in other motor vehicles. Yet another object of this invention is to provide a mounting assembly that is inexpensive and has a relatively simple construction.

The mounting assembly includes a shaft member having a planar member, or mounting member, mounted on a top end of the shaft. The planar member is preferably mounted so it pivots with respect to the shaft. The shaft is insertable in a hollow cylinder on a motor vehicle. In the case of a motorcycle, a portion of the shaft is inserted in a steering stem of a steering head. A plurality of o-rings, attached to a portion of the shaft inserted in the cylinder, secure the mounting assembly in place. A Velcro™ piece, fixed to a top surface of the planar member, clasps to a corresponding Velcro™ piece of an electronic device placed on the mounting assembly.

The shaft may also be adapted to have an additional flexion point below the planar member, or mounting member to add to the variable positions of the mounting assembly. For example, the shaft may have a lower portion, inserted in the stem of the motorcycle, pivotally coupled to an upper portion to which the mounting member is attached. In addition, more than one mounting member may be pivotally coupled to a top end of the shaft so that a plurality of accessory devices can be mounted to the motor vehicle. The mounting members are preferably pivoted on the shaft independent of one another.

An adapter is also used to secure the mounting assembly in steering stems having larger diameters. The adapter may be a cylinder secured in the steering stem with o-rings similar to the shaft of the mounting assembly. A rim is disposed along, and integral with, a top end of the adapter and engages a top edge of the steering stem to prevent the adapter from following through the steering stem.

BRIEF DESCRIPTION OF THE DRAWINGS

FIG. 4 is a side view of a second embodiment of the mounting assembly.

FIG. 5 is a perspective view of third embodiment of the invention.

DETAILED DESCRIPTION OF THE DRAWINGS

Figure 1:
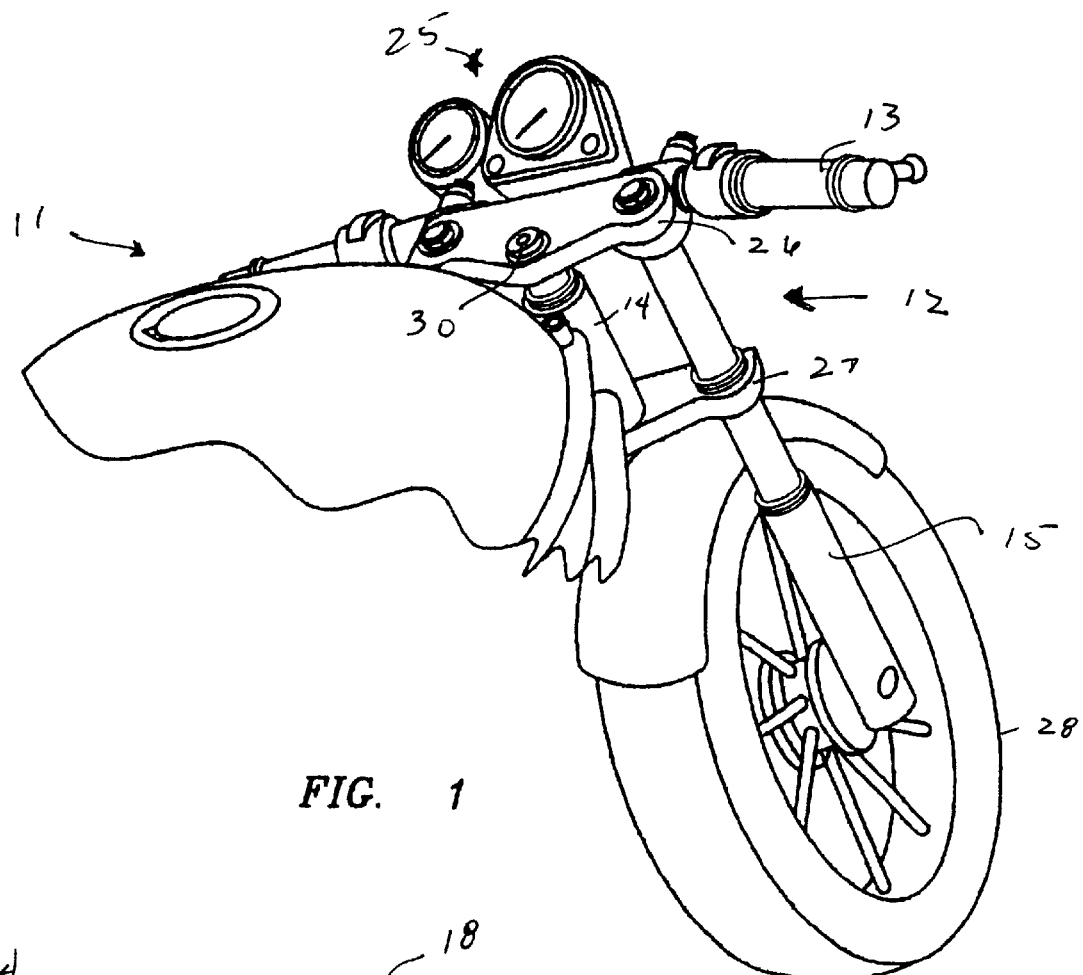
FIG. 1 is a top perspective view of a steering head of a motorcycle.

Many designs of motorcycles 11, known as sport and/or sport touring motorcycles, include a steering head 12 as illustrated in FIG. 1. The steering head 12 includes an upper triple clamp 26 and a lower triple clamp 27. The triple clamps 26 and 27 operationally link together two steering forks 15 to the front wheel 28. Handle poles 13 are mounted to the upper triple clamp 26. A hollow cylinder referred to as a steering stem 14 connects the upper triple clamp 26 to the lower triple clamp 27. On many motorcycles, the top 30 of the steering stem 14 remains open. On other models, manufacturers may cover the steering stem 14 with some type of cover such as a cap threaded on the top of the steering stem 14.

Figure 2:
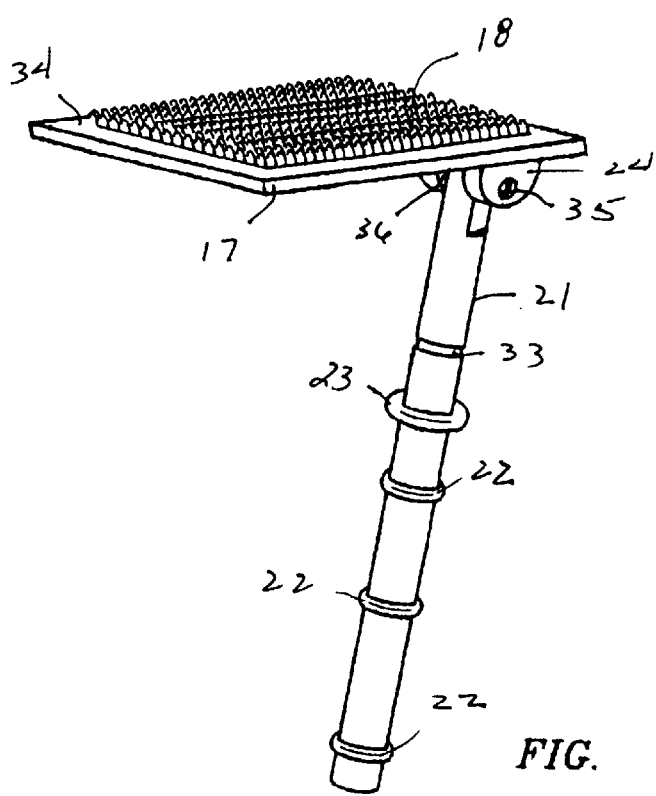
FIG. 2 is a perspective view of the mounting assembly.

The mounting assembly 16 is generally shown in FIG. 2. The mounting assembly 16 includes a mounting member 17 mounted to a shaft 21. As shown in FIG. 2, the planar member 17 is mounted at an acute angle with respect to the shaft 17. The steering stem 14 extends parallel to the steering forks 15 and extends at an angle less than perpendicular from horizontal. Accordingly, the planar member 17 and shaft 21 are mounted at such an angle with respect to one another such that the mounting planar member 17 is disposed in a substantially horizontal plane when the shaft 21 is inserted in the steering stem 14.

The planar member 17 and shaft 21 may be mounted in a fixed relationship to one another. As shown in FIG. 4, a mounting block 24 is secured to a bottom surface of the planar member 17. In addition, the shaft 21 is mounted to the mounting block 24 and extends downward therefrom at an acute angle with respect to the planar member 17. The shaft 21 may have a threaded end 16 fitted in mating relationship to a threaded aperture 32 on the mounting block 24. The planar member 17 is fixed to the block 24 by an adhesive. All parts of the mounting assembly 16 are preferably constructed of aluminum.

In an alternative embodiment shown in FIGS. 2 and 5, the planar member 17 is pivotal with respect to the shaft 21. The mounting block 24 has a groove 36 within which a top end of the planar member 17 fits. A pin 35 extends through the block 24 and shaft 21 so the shaft 21 rotates on the pin 35. Accordingly, the planar member 17 pivots with respect to the shaft 21. In this manner, the planar member 17 is adjusted to a desired pitch for operation of the radar detector, or for viewing of a cellular phone or global positioning device.

With respect to FIGS. 2 and 5, a means for securing the mounting assembly 16 in the steering stem 14 is shown. Such securing means includes a plurality of o-rings 22 disposed along a portion of the shaft 21 insertable within the steering stem 14. The o-rings 22 also space the shaft 21 from an interior surface of the steering stem 14. Thus, the o-rings 22 isolate the shaft 21 from in the steering stem 14, in order to avoid a metal-to-metal contact. The o-rings 22 absorb any vibrations and maintain the mounting assembly 16 in a stable position within steering stem 14.

In addition, a top o-ring 23 is attached to the shaft 21 above the plurality of o-rings 22. This top o-ring 23 has a larger diameter than the plurality of o-rings 22 and serves as a stop when the shaft 21 is inserted within the cylinder 14. The top o-ring 23 abuts a top edge of the stem 14, preventing the shaft 21 from dropping into the stem 14. The top o-ring 23 and plurality of o-rings 22 are similarly attached to the stem 21. Specifically, channels 33 are machined onto the stem and extend annularly around the stem. The o-rings 22 and 23 are seated within the channels 33.

The mounting assembly 16 is universal in the sense that it is designed to fit different models of vehicles with which the mounting assembly is used. In the present specification, the vehicles chosen by way of example, are motorcycles. Accordingly, the mounting assembly 16 is adaptable for use with different sport and/or sport touring motorcycle models. The instrument panels 25 adjacent in motorcycle steering heads 12 vary in height. Accordingly, a user may have to adjust the height of the vehicle accessory with respect to the instrument panel 25. Taller accessories, such as a camcorder may require a lower adjustment to stabilize such a larger device in the motorcycle.

The shaft 21 on the mounting assembly 16 is preferably seven inches in length; however, the length of that portion of the shaft 21 inserted into the stem 14 is adjustable. As shown in FIGS. 2 and 5, the shaft has a plurality of channels 33 within which the o-rings 22 and 23 seat. Additional channels 33 may be added so the top o-ring 23 can be moved between the channels 33 to adjust the height of the device mounted on the mounting assembly.

Moreover, the inside diameter of the stems 14 may also vary, or change. Presently most sport and/or sport touring motorcycles incorporate stems having an inside diameter of about thirteen millimeters. The outside diameter of the o-rings 22 is generally about 12.75 millimeters, and firmly secures a shaft 21 within the stem 14. The o-rings 22 are interchangeable with larger and smaller o-rings as necessary to fit the stem 14.

Figure 7:
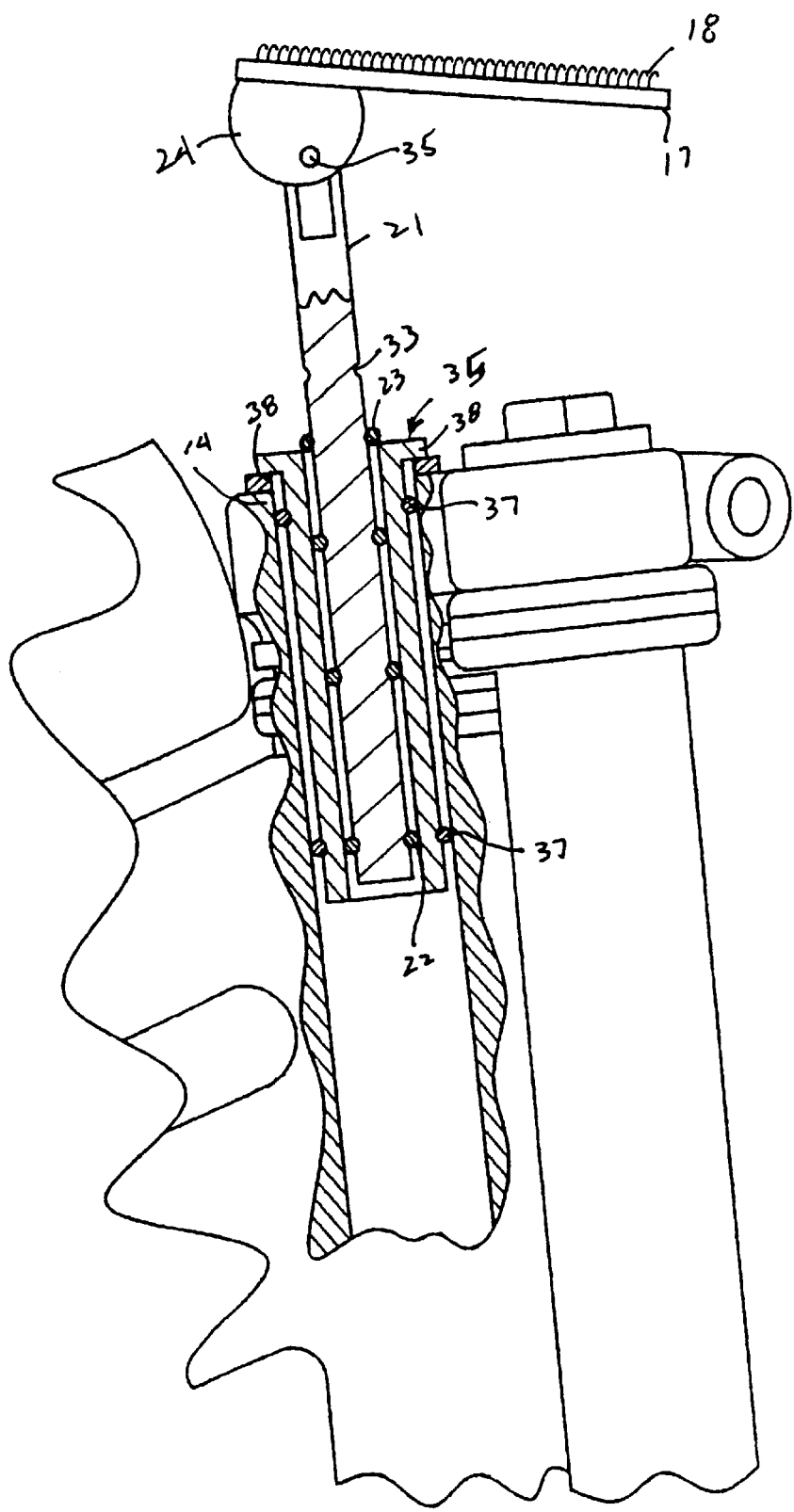
FIG. 7 is a side sectional view of the third embodiment of the mounting assembly on a motorcycle.

For the most part, motorcycle steering stems are close in size. However, other motorcycle steering stems 14 are up to twenty-three millimeters in inside diameter. In such cases, an adapter 36 shown in FIGS. 5 and 7, is cylinder within which the shaft 21 of the mounting assembly 16 fits. The adapter 36 has an upper and lower o-ring 37 that isolate the adapter from the inside surface of the stem 14, and secure the adapter 36 in the stem 14. The adapter 35 also has a rim 38 at the top end of the adapter 36. The rim 38 engages a top edge of the stem 14 to prevent the adapter 36 and mounting assembly from dropping in the stem 14.

Figure 3:
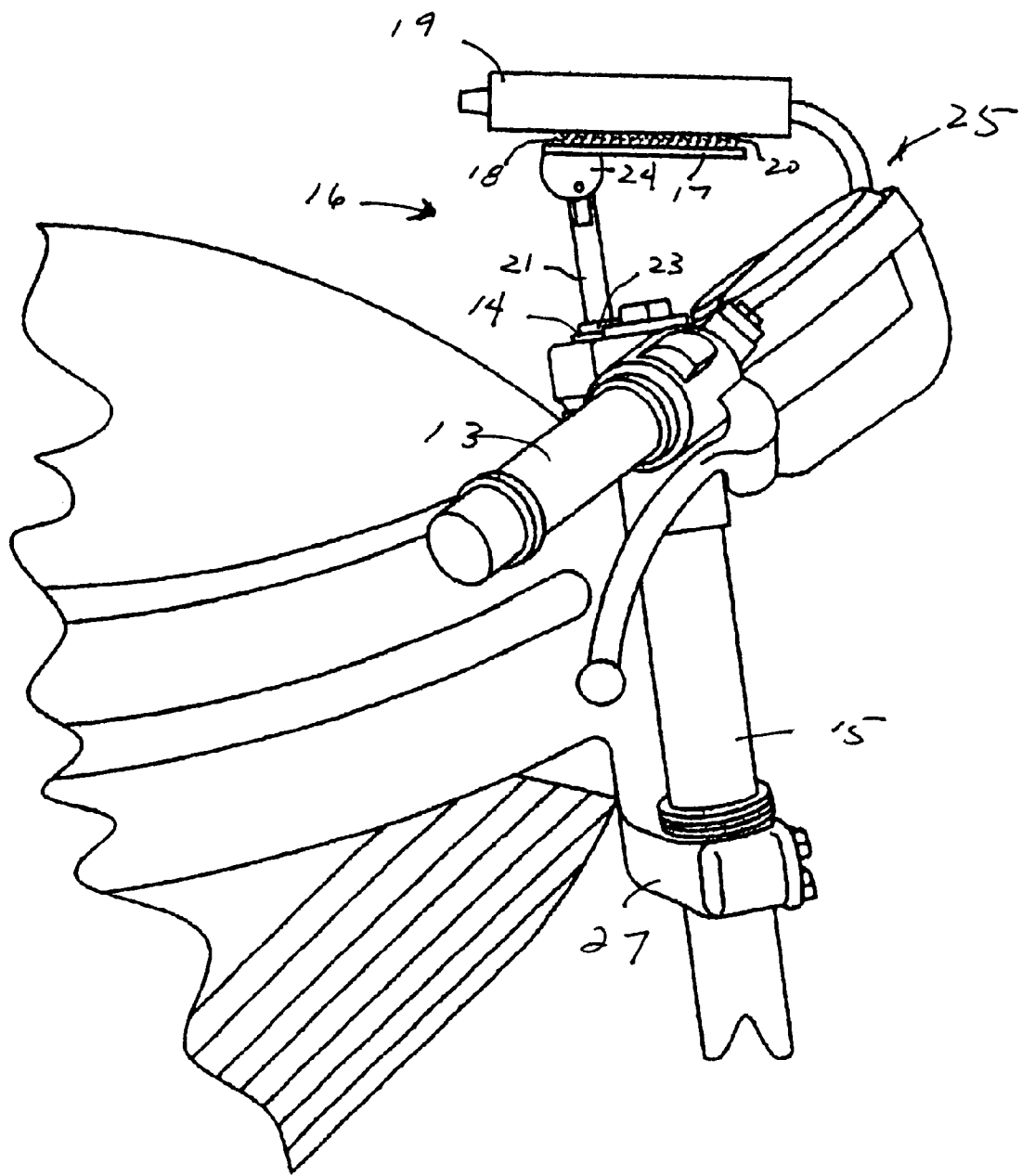
FIG. 3 is a side view of the mounting assembly with a radar detector.
Figure 6:
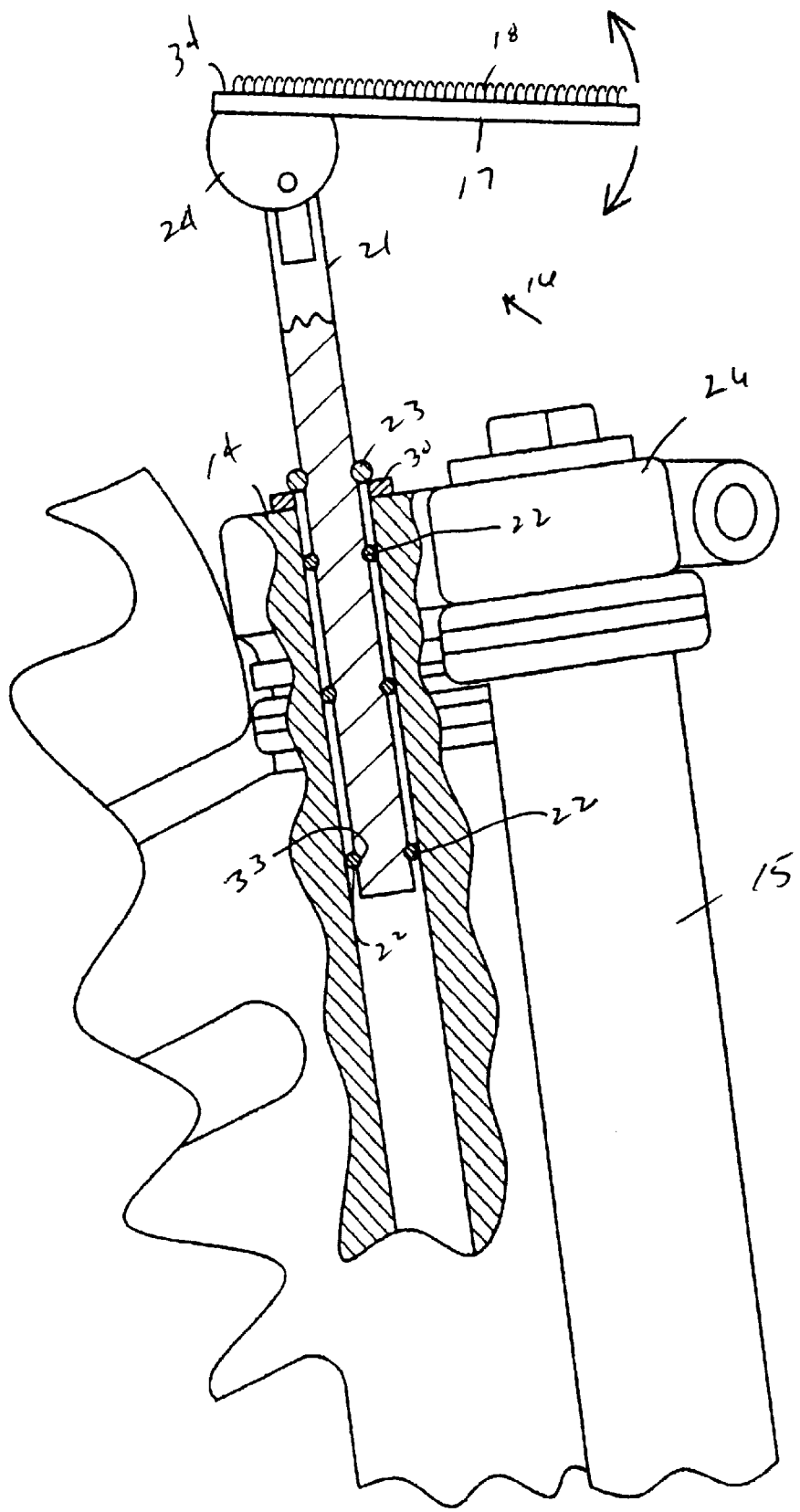
FIG. 6 is a cross sectional view of a motorcycle steering head with a mounting assembly.

A Velcro™ sheet 18 is mounted on a top surface 34 of the planar member 17. As shown in FIG. 3, an electronic device such as a radar detector 19 has a corresponding Velcro™ sheet 20 attached to its underside for its attachment to the Velcro™ 18 on planar member 17.

In operation, the shaft 21 of the mounting assembly 16 is inserted into the steering stem 14. The plurality of o-rings 22 are substantially equal to, or slightly larger, than the inside diameter of the cylinder 14 so the o-rings 22 secure the stem 21 within the cylinder 14 stabilize in the mounting assembly 16 on the motorcycle 11. The top o-ring similarly fits within the hollow steering stem 14. Given its larger size the top o-ring 23 prevents the stem from slipping further into the stem 14. The radar detector 19 is attached to the planar member 17 by the Velcro™ sheets 18 and 20. The planar member 17 is disposed in a substantially horizontal position and is at a height sufficient so the radar detector effectively operates. In addition, the planar member 17 is pivoted to a desired pitch for operation of the electronic device.

Figure 8:
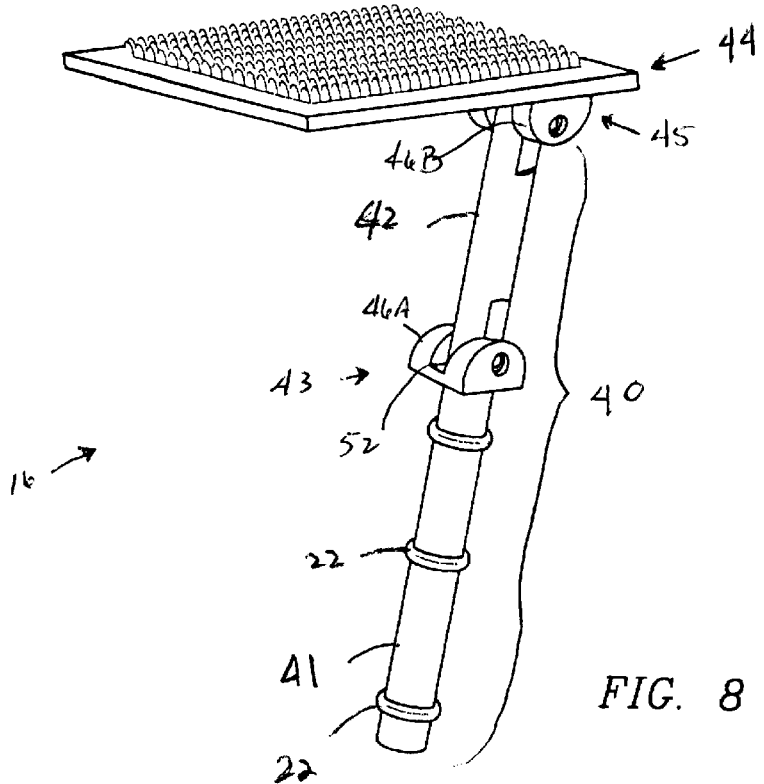
FIG. 8 is a perspective view of a third embodiment of the invention.
Figure 9:
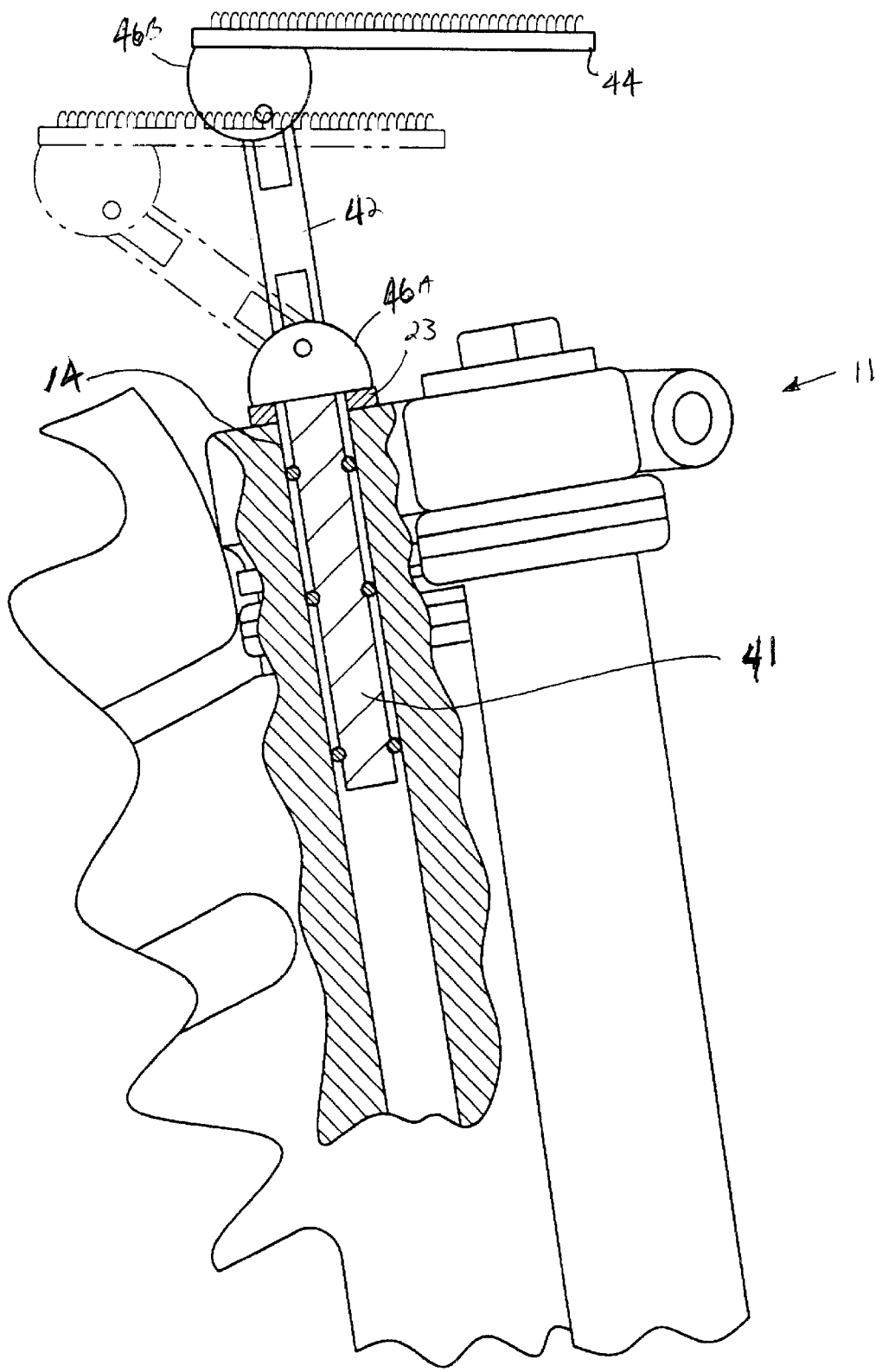
FIG. 9 is a sectional view of the third embodiment installed in a motorcycle steering assembly.

With respect to FIGS. 8 and 9, a third embodiment of the mounting assembly is illustrated. The third embodiment includes a shaft member 40 that is flexible at some point between a bottom end of the shaft member 40 that is inserted in the motorcycle stem of the motorcycle and a top end of the shaft member 40 to which a mounting member 44 is attached. The embodiment shown in FIGS. 8 and 9 includes a first joint 43 and a second joint 45 so the mounting assembly 16 and accessory device can be adjusted to a desirable position on the motorcycle 11. The lower shaft member 41 is inserted into the stem 14. As previously described above, o-rings 22 are spaced apart along the lower shaft member 41 and secure the shaft 40 in the stem 14.

Each joint 43 and 45 includes a coupler to which members are attached. The coupler 46A of the first joint 43 is secured to a top end of the lower shaft member 41 and to the bottom end of the upper shaft member 42. Similarly coupler 46B is attached to the top end of the upper shaft member 42, and the mounting member 44. Each coupler 46A and 46B has a groove 52 within which ends of the upper shaft member 42 are inserted and pivotally attached. In this manner, the upper shaft member 42 can be pivoted with respect to the lower shaft member 41, which is inserted in the motorcycle stem 14. In addition, the mounting member 44 is pivotal on the upper shaft member 42 for appropriate orientation of the accessory device on the motorcycle 11.

O-rings 22 are spaced apart along a longitudinal axis of the lower shaft member 42, and secure the mounting assembly on the motorcycle. The o-rings also minimize any vibrations of the mounting assembly, which allows the accessory device to effectively operate. A top o-ring 23 is also attached to the lower shaft as described above, to prevent the shaft member 40 from slipping in the stem 14. As shown in FIG. 8, the top o-ring abuts the coupler 46A, and a rim along the stem 14.

The upper shaft member 42 can be pivoted toward a driver, and the mounting member 44 and accessory devise are adjusted to an operating position. In this manner, the accessory device can be lowered so the accessory device does not block the driver's view of the motorcycle instruments.

Figure 10:
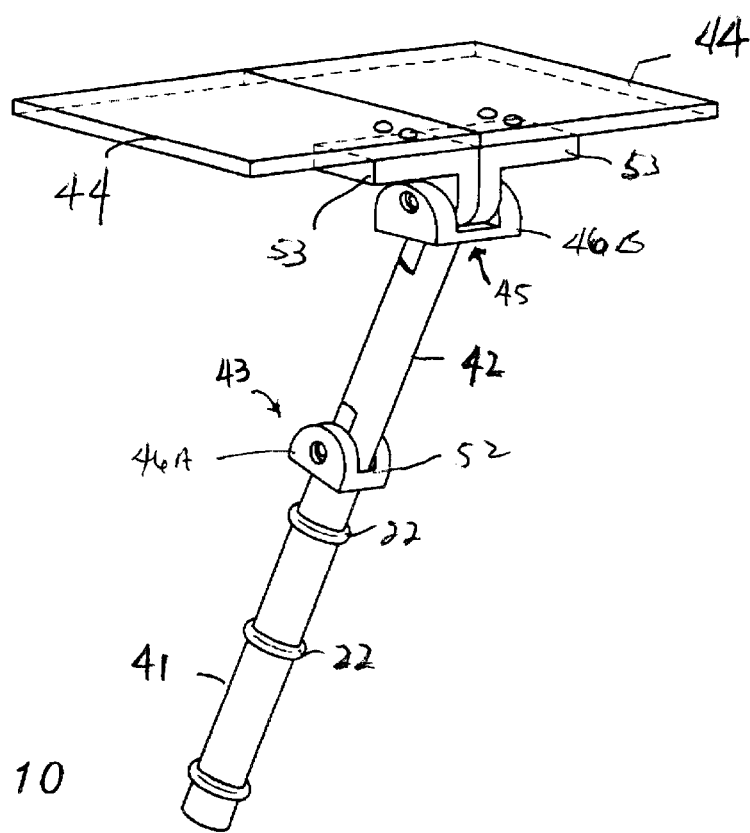
FIG. 10 is a perspective view of a fourth embodiment of the invention.

A fourth embodiment is illustrated in FIG. 0, and incorporates a plurality of mounting members 44 attached to the top end of the upper shaft member 42. As shown in FIG. 10, two connectors 53 are attached to the coupler 46B. A mounting member 44 is secured to each connector 53, which is pivotal with respect to the coupler 46B. The mounting members 44 pivot on the coupler 46B independently of one another. In this manner, a motorcycle operator can attach two different accessory devices to the mounting assembly 16, and adjust each independently to a desired operating position.

It should be noted that the mounting assembly 16, could be made so that the upper shaft member 42 can be removed and replaced with a different member. For example an upper shaft member 42 having only a single mounting member attached, could be replaced with another upper shaft member 42 that has the plurality of mounting members 44 as described above.

While the preferred embodiments of the present invention have been shown and described herein in the context of a motorcycle, it will be obvious that such embodiments are provided by way of example only and not of limitation. Numerous variations, changes and substitutions will occur to those of skilled in the art without departing from the invention herein. For example, the present invention need not be limited to motorcycles, since other types of vehicles or other applications can equally benefit from the teachings of the present invention. Accordingly, it is intended that the invention be limited only by the spirit and scope of the appended claims.

What is claimed is:

1. A mounting assembly for mounting accessory devices on a motorcycle, comprising:
    (a) a shaft having a first end inserted within a stem of a steering assembly on said motorcycle;
    (b) at least one mounting member coupled to a second end of the shaft, upon which the accessory device is capable of being mounted;
    (c) an assembly stabilizer contacting the shaft of the mounting assembly and the stem of the motorcycle; and,
    (d) said assembly stabilizer including at least one o-ring disposed on that portion of the shaft inserted within the stem.

2. The mounting assembly of claim 1 further including a mounting member attached to a second end of the shaft, and said accessory device capable of being mounted on the mounting member, and said mounting member is pivotal with respect to the shaft member.

3. The mounting assembly of claim 1 wherein said shaft includes a lower portion inserted into the stem on the steering assembly of the motorcycle and an upper portion pivotally coupled to said lower portion of the shaft.

4. The mounting assembly of claim 3 further including a mounting member attached to the upper portion of the shaft, and said accessory device is capable of being mounted on the mounting member, and said mounting member is pivotal with respect to the shaft member.

5. A mounting assembly for mounting accessory devices on a motorcycle, comprising:
    (a) a first shaft member having a first end inserted within a stem of a steering assembly on said motorcycle;
    (b) a second shaft member pivotally coupled to a second end of the first shaft member; and
    (c) at least one mounting member, coupled to the second shaft, and upon which the accessory device is capable of being mounted; and,
    (d) an assembly stabilizer contacting the first shaft member of the mounting assembly and the stem on the steering assembly of the motorcycle; and,
    (e) said assembly stabilizer including at least one o-ring disposed on that portion of the first shaft member inserted within the stem.

6. A mounting assembly for mounting accessory devices on a motorcycle, comprising:
    (a) a first shaft member having a first end inserted within a stem of a steering assembly on said motorcycle;
    (b) a second shaft member pivotally coupled to a second end of the first shaft member; and,
    (c) two mounting members attached to a second end of the shaft, and accessory devices capable of being mounted to each of the mounting members, and each said mounting member is pivotal with respect to the shaft member, and independent of one another.

7. A method for mounting accessory devices to a motorcycle, comprising the steps of:
    (a) securing a mounting assembly to a stem of a steering assembly on said motorcycle;
    (b) attaching the accessory device to the mounting assembly;
    (c) including the step of providing a plurality of mounting members attached to the shaft member, and attaching the accessory device to one or more of said mounting members.

8. The method of claim 7 wherein said securing step includes inserting a first end of a shaft member into the stem on the steering assembly of the motorcycle, and the attaching step includes the accessory device to a second end of the shaft member.

9. The method of claim 7 wherein said securing step includes inserting a first end of shaft member into the stem on the steering assembly of the motorcycle, and said attaching step includes attaching the accessory device to a second end of the shaft member wherein said accessory device pivotally attached to the shaft member.

10. The method of claim 7 further including the step of providing a shaft member that is pivotal on at least one point above the stem on the steering assembly and below a mounting member attached to the shaft member.

11. A mounting assembly for mounting accessory devices on a motorcycle, comprising:
    (a) a shaft having a first end inserted within a stem of a steering assembly on said motorcycle; and,
    (b) at least two mounting members coupled to a second end of the shaft to which the accessory device is capable of being mounted, and each said mounting member is pivotal with respect to the shaft member and independent of one another.

* * * * *